(No Model.) 2 Sheets—Sheet 1.
T. W. MORAN.
RELIEF VALVE FOR STEAM PIPES.
No. 500,505. Patented June 27, 1893.
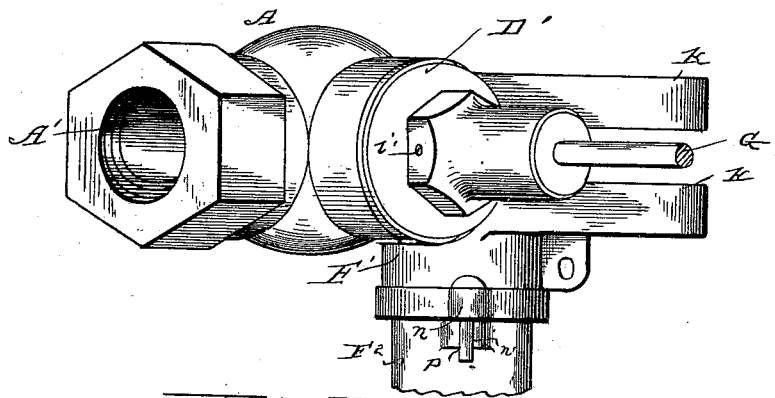
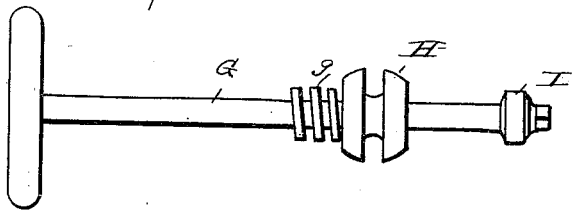
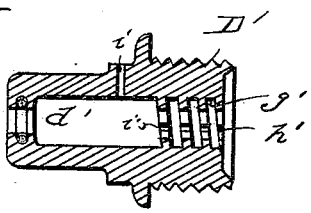
Witnesses
Jesse Heller
Phil Masi
Inventor
Thomas W. Moran,
by E. W. Anderson
his Attorney

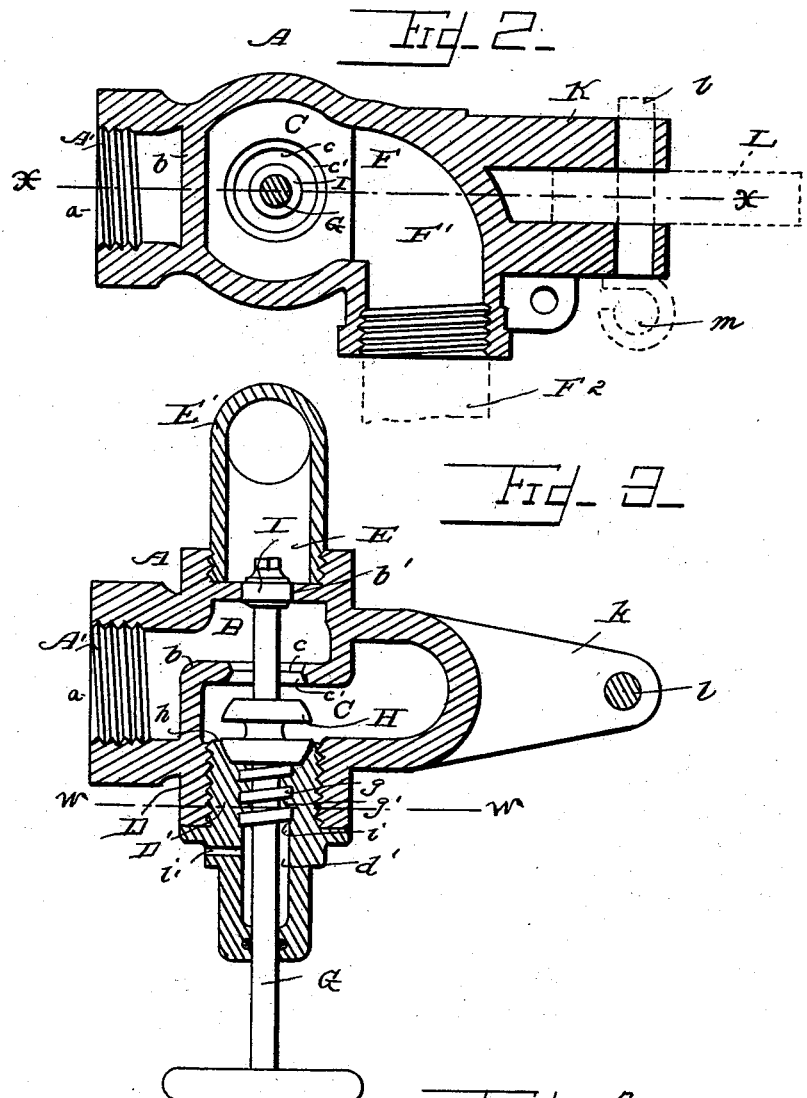

UNITED STATES PATENT OFFICE.

THOMAS WILLIAM MORAN, OF LOUISVILLE, KENTUCKY, ASSIGNOR TO THE MORAN FLEXIBLE STEAM JOINT COMPANY, OF SAME PLACE.

RELIEF-VALVE FOR STEAM-PIPES.

SPECIFICATION forming part of Letters Patent No. 500,505, dated June 27, 1893.

Application filed November 26, 1892. Serial No. 453,245. (No model.) Patented in England January 14, 1892, No. 151; in France January 14, 1892, No. 218,675; in Belgium January 14, 1892, No. 97,925, and in Germany January 14, 1892, No. 65,277.

*To all whom it may concern:*

Be it known that I, THOMAS WILLIAM MORAN, a citizen of the United States, and a resident of Louisville, in the county of Jefferson and State of Kentucky, have invented certain new and useful Improvements in Relief-Valves for Steam-Pipes, (for which I have obtained patents as follows: in Great Britain, No. 151, dated January 14, 1892; in France, No. 218,675, dated January 14, 1892; in Belgium, No. 97,925, dated January 14, 1892, and in Germany, No. 65,277, dated January 14, 1892;) and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective of the valve. Fig. 2 is a vertical longitudinal section of same. Fig. 3 is a section on line $x$ $x$ Fig. 2. Fig. 4 is a section on line $w$ $w$ Fig. 3. Fig. 5 is a detail view of valve and stem, and Fig. 6 is a sectional detail of the bearing plug.

This invention has relation to relief valves especially adapted for use in connection with steam heating pipes of railway cars, and it consists in the novel construction and combination of parts as hereinafter specified.

In the accompanying drawings, the letter A designates the valve casing having at one end the threaded cylindrical opening or aperture $a$ for connection with the train pipe A'. This opening leads into a chamber B in one side of the casing, separated by a partition wall $b$ from a chamber C in the opposite side. In this partition is a steam port $c$ communicating with both chambers, and having formed therein, on the side of the chamber C, a spherically beveled valve seat $c'$. Leading outwardly from the chamber C is a threaded aperture D in which is held a bearing plug D'. Leading outwardly from the chamber B is a port $b'$ communicating with a threaded aperture E, to which may be connected a pipe section or elbow E'. In the forward wall of the chamber C is a port F, which communicates with an elbow portion F', to which is connected a vertical portion $F^2$ of the steam pipe coupling sections.

G is a valve stem, which projects outwardly through the bearing plug D' and provided at its outer end with a hand wheel, or other operating means. Said stem has a male threaded portion $g$, engaging a corresponding female threaded portion $g'$ of the aperture $d'$ in the bearing plug through which it passes. Below the threaded portion $g$, said stem carries a valve H, which consists of the segment of a sphere, grooved or cut away at its central portion. One end of this valve is adapted to fit the seat $c'$, while the other end fits a concave or spherically beveled seat $h$ in the lower end of the bearing plug. The inner end of the stem carries a second, but smaller valve I, adapted to seat in and close the port $b'$, leading into the aperture or chamber E. Extending outwardly from the seat $h$ in the bearing plug are the grooves or ways $h'$ which communicate with an enlarged portion $i$ of the aperture $d'$, from which leads the relief aperture $i'$.

When the stem is screwed outwardly to open the port $c$, and permit the passage of steam, into the casing and through the pipe sections, the upper end of the valve H will seat in the bearing plug, preventing the entrance of any steam thereto. At the same time the valve I will seat in and close the port $b'$. When however the valve H is screwed down to close the port $c'$, the said valve is carried away from its seat in the bearing plug. At the same time, the valve I is carried through into the aperture E, and the port $b'$ is opened. In this position, any steam remaining in the coupling when the valves are closed is allowed to escape, relieving the pipe or hose sections of unnecessary pressure.

The aperture E, and the elbow E' are provided, in case it is desired to effect a coupling with a car fitted with a different system of couplings, not adapted for connection with the elbow F'. In this case the port $c'$ is closed by the valve H, the port $b'$ being open, the steam passing from the chamber B through said port $b'$ or vice versa.

On the opposite end of the casing from the connection $a$ for the train pipe may be provided the arms $k$, between which is secured a bracket or brace L secured to the car frame, and forming the support for the said casing. The lower end of the bolt $l$ which secures the bracket or brace L on the arms $k$, may be provided with an eye $m$, to provide for the connection thereto of the upper end of the slack or tripping chain of the coupling.

The various parts may be provided with wrench seats as shown, in order to permit their ready connection and disconnection.

The lower end of the elbow $F'$ may be provided with apertured lugs or ears $n$, through which may be passed pins or bolts $n'$, which engage lugs or grooves $p$ in the pipe section $F^2$, to prevent the coupling from unscrewing. By means of the segmental spherical valve and the corresponding beveled seats therefor, perfectly steam tight joints are provided.

Having described this invention, what I claim as new, and desire to secure by Letters Patent, is—

1. The relief valve, comprising the casing A, having the opening $a$ for connection with an inlet pipe, a chamber B into which said opening leads, a second chamber C, a port $c$ connecting said chambers B and C, a threaded opening leading outwardly from said chamber C, a bearing plug $D'$ seated in said opening, and having a valve seat on its inner end, a port $b'$ leading outwardly from said chamber B, a valve seat in said port, and a valve stem having a screw-bearing in the bearing plug $D'$, said stem carrying a double seating valve H, and a second valve I, and an escape passage through said bearing plug, substantially as specified.

2. In a relief valve, the combination with the casing having the chambers B and C connected by a port $c$, having a spherically beveled valve seat $c'$, the inlet $a$, and outlet $F'$, the elbow $E'$, the port $b'$ leading from the chamber B into said elbow, and the bearing plug $D'$ having a threaded opening therein and a relief passage, and a spherically beveled valve seat $h$, of the valve stem having a seat in said threaded opening, the double seating spherically beveled valve carried by said stem, and the valve I also on said stem, substantially as specified.

In testimony whereof I affix my signature in presence of two witnesses.

THOMAS WILLIAM MORAN.

Witnesses:
C. Q. MARTIN,
ORTON T. MORAN.